US005714367A

United States Patent [19]

Quick et al.

[11] Patent Number: 5,714,367

[45] **Date of Patent: *Feb. 3, 1998**

[54] GENUINE GOLD THREE DIMENSIONAL SIGN MAKING BLANK FOR COMPUTER AIDED ROUTER ENGRAVING SIGN MAKING SYSTEMS

[75] Inventors: Charles E. Quick; Jamie R. Quick, both of Middletown, N.Y.

[73] Assignee: Signgold Corporation, Middletown, N.Y.

[ * ] Notice: The term of this patent shall not extend beyond the expiration date of Pat. No. 5,338,615.

[21] Appl. No.: 432,244

[22] Filed: May 3, 1995

[51] Int. Cl.[6] .............................. B32B 3/00; B32B 27/14; B32B 15/04; B32B 15/08

[52] U.S. Cl. .......................... 428/195; 428/203; 428/457; 428/458; 428/461

[58] Field of Search ...................................... 428/457, 458, 428/461, 195, 203

[56] References Cited

U.S. PATENT DOCUMENTS

| | | | |
|---|---|---|---|
| 3,753,850 | 8/1973 | Brunet | 161/214 |
| 4,231,833 | 11/1980 | Lieberman | 156/249 |
| 4,484,970 | 11/1984 | Burzlaff | 156/233 |
| 4,720,315 | 1/1988 | Greenman | 156/233 |
| 4,834,276 | 5/1989 | Logan | 226/76 |
| 4,855,171 | 8/1989 | McKie | 428/40 |
| 4,867,827 | 9/1989 | Leiseur | 156/241 |
| 4,869,767 | 9/1989 | Robinson | 156/233 |
| 4,895,287 | 1/1990 | Wood | 226/76 |
| 4,904,325 | 2/1990 | Crass | 156/233 |
| 4,994,131 | 2/1991 | Edwards | 156/233 |
| 5,017,255 | 5/1991 | Calhoun | 156/230 |
| 5,104,719 | 4/1992 | Kamen | 428/195 |
| 5,240,778 | 8/1993 | Quick | 428/457 |
| 5,338,615 | 8/1994 | Quick | 428/457 |

FOREIGN PATENT DOCUMENTS

| | | |
|---|---|---|
| 0003402 | 8/1979 | European Pat. Off. . |
| 0424173A2 | 10/1990 | European Pat. Off. . |
| 2498986 | 8/1982 | France . |
| 0068238 | 4/1984 | Japan . |
| 0025800 | 2/1985 | Japan . |
| 1290087 | 12/1986 | Japan . |
| 0044491 | 2/1987 | Japan . |
| 2196651 | 8/1990 | Japan . |
| 2249640 | 10/1990 | Japan . |
| 2251438 | 10/1990 | Japan . |
| WO 90/15724 | 6/1990 | WIPO . |

OTHER PUBLICATIONS

"How to Succeed in Dimensional Sign Business", Advertising Brochure, Gerber Routers, Gerber Scientific Products, Manchester, CT 06040, 1994.

"Computer Aided Engraving Machine PNC-2100-CAMM-2 Series", Advertising Brochure, Roland Digital Group, Irvine, CA 92714, Apr. 1994.

"More Router System for More Value", Advertising Brochure, Machine Automation Technologies, Inc., db Technologies, Breckenridge, CO 80424, undated.

"EnRoute", Advertising Brochure, Scanvec, Wilmington, MA 01887, undated.

"Sign Machine", Advertising Brochure, ABC Sign Products, Fort Collins, CO 80525, undated.

"Router/Engraving Systems", Advertising Brochure, Computerized Cutters, Inc., Richardson, TX 75081, undated.

"Precix Router Systems", Advertising Brochure, Omnicad Services, Bellingham, WA 98227-9754, undated.

(List continued on next page.)

*Primary Examiner*—Patrick Niland
*Attorney, Agent, or Firm*—Alfred M. Walker

[57] ABSTRACT

A multi-layered sign blank material for computer-aided routed and engraving sign-making is provided in which the letter or graphic making medium is genuine gold. The genuine gold is highly fade resistant in use due to its natural resistance to attack by ultra violet light. The genuine gold will not fade under normal exposure to UV light for long periods of time.

5 Claims, 2 Drawing Sheets

OTHER PUBLICATIONS

"SignTrack®", Advertising Brochure, Apco Graphics, Inc., Atlanta, GA 30312–2227, 1993.

Farco Plastics Supply Inc., Clearwater, FL 34624–7492, Advertising Brochure, undated.

"Sprocket Feed Sign Maker Camm–1" Advertising Brochure, Roland Digital Group, Irvine, CA 92714, undated.

"The Reel Solution", Advertising Brochure, Weber Made Enterprises, Carlos, MN 56319, undated.

"Gap™ Introduces:", Advertisement, Gap Company, Sun Valley, CA 91352, undated.

"Gerber Goes Farther", Advertising Brochure, Gerber Scientific Products, Manchester, CT 06040, 1994.

LeBlanc "Gold–Leaf Techniques" Third Edition, pp. 16–42, undated.

Society of Gilders, "The Gilder's Manual", pp. 28–38, undated.

Scotch Brand ATG Adhesives System, Advertising Brochure, "Scotch Brand ATG Adhesives Systems" Advertising Brochure, p. 6, undated.

Arlon—Adhesives & Films Division, "Imitation Gold Leaf", Advertising Brochure, undated.

"Arlon Presents Calon II", Advertising Brochure, p. 3, undated.

"Redi–Leaf Metallic Leaf Gold", Advertising Brochure of Rediforms, Paramus, NJ, undated.

"Royal–Gild Gold Leaf Computer Vinyl" Advertising Brochure, undated.

Gerber Scientific Products, "Lettering Supplies and Materials" P36262A, Manchester, CT, undated.

Universal Products, "Color Chart", Goddard, KS, Advertising Brochure, undated.

Universal Products, "Polyester Films", Advertising Brochure, Goddard, KS Sep. 1991.

Gregory, Inc., "Materials Pricing—Vinyl Color Chart", Advertising Brochure, PVPL–9 4925, Buhler, KS, undated.

Vector Graphic Supplies, Advertising Brochure, Yonkers, NY, p. 8, undated.

Spartan International, Inc. "Spar–Cal Computer Graphic Films", Holt, MI, Advertising Brochure, undated.

Graphic Materials International, "Product & Color Selection Guide", Advertising Brochure, Sun Valley, CA, undated.

SignCraft Magazine, "Doing the Classic Two–Toned Gold Leaf Window" Tom McIltrot, magazine article, pp. 46–58, undated.

GENUINE GOLD THREE DIMENSIONAL SIGN MAKING BLANK FOR COMPUTER AIDED ROUTER ENGRAVING SIGN MAKING SYSTEMS

FIELD OF THE INVENTION

The present invention is directed to a three dimensional sign blank material deposited with genuine gold, wherein the material sign blank is cut, routed and engraved with desired lettering and graphics by a conventional computerized sign making apparatus.

The present invention relates to durable, three dimensional sign blanks which provide metallic gold as the reflective sign lettering and graphics on the sign blanks, to replace manually applied gold leaf lettering on carved wood sign blanks.

The blanks are ultra violet [UV] fade-resistant in use and are easy to cut on computer-aided router and engraving sign making systems. Thus, the genuine gold blank of the present invention is ideal for outdoor use because the genuine gold is colorfast and fade resistant.

BACKGROUND OF THE INVENTION

The prior art includes the use of traditional manually applied gold leaf lettering and graphics upon a cut and routed wood sign blank, such as redwood, which is insect resistant. Traditionally the preparation of the wood blank involves sanding and sealing of the wood blank, and applying of a primer coat and finishing paint. The wood blank is cut and routed out, or carved out with letters. The carved surface is prepared by sanding, sealing and application of a primer. Then a hard coat adhesive is applied and the traditional gold leaf is laid in by hand in a pain staking manual application.

The prior art includes computerized CAD systems which make masks upon sign blanks, which are then sand blasted and exposed by abrading the wood blank. These computer routing and carving systems only save on hand carving, and do not reduce the time and effort required to apply traditional gold leaf, and they require special woods which are not damaged by sandblasting.

Most importantly, the makers of signs with computerized sign carving systems still need to apply traditional gold leaf by hand.

A drawback to computerized sign sandblasting carving systems is an aesthetic problem, in that they can only cut down vertically and across, in X-Y axes, so one cannot do beveled edges with the computerized sandblasting devices, only perpendicular lettering cuts, which perpendicular cuts have a narrower viewing angle than bevelled edge lettering cuts.

One computerized sign carving device can do bevelled v-shaped cuts, namely a "MultiCam 44" machine of Automatic Technologies, Inc. However, it still needs a manual traditional gold leaf application to complete the sign lettering.

One approach to manufacturing signs is to cut the desired sign letter or graphic from a three dimensional stock material blank. A number of machines are available in commerce for this purpose. Most notable are those computer-aided sign making machines manufactured by Gerber Scientific Instruments, such as the DIMENSION 200, DIMENSION 200X, DIMENSION 200E and ADVANTAGE ROUTER 600 router sign making machines. Other devices are the ENROUTE routing sign making machine of Scanvec, the ACCU-CUT machine of Computerized Cutters, Inc., the PNC-2100 computer-aided engraving machine of Roland Digital Group, THE SIGN MACHINE of ABC Products, Inc. and the PRECIX router/engraver of Omnicad Services, affiliated with ABC Sign Products. Such machines selectively cut through a three dimensional sign blank, the cutting being effected under computer control. Such machines enable a letter or graphic to be cut into three dimensional sign blank stock material, so that traditional gold leaf can be applied thereto.

The prior art also includes U.S. Pat. Nos. 5,240,778 and 5,338,615 of the Applicants herein for genuine gold sign making films for computer-aided sign making films.

However, these genuine gold sign making films are applied to flat surfaces.

The conventional art in modern use employs vinyl films impregnated with organic pigments or dyes, and these are used with release coated materials where transfer tapes are required for the sign making process. The conventional organic pigments suffer from the defect that they are not suitable for outdoor use because the dyes and pigments are subject to attack and degradation by ultra violet light. In contrast, the present invention employs a thin layer of genuine gold in a sign legend suited to outdoor use because genuine gold is impervious to attack by ultraviolet light.

In contrast to the prior art, the present invention produces the sign legend pattern by using a computer-aided router engraver sign making system. In addition, the genuine gold of the present invention is vapor deposited and is only about 300 Angstroms thick. Because it is vapor deposited, the genuine gold of the present invention is completely uniform in thickness. Moreover, because the genuine gold of the present invention is only from about 100 to about 300 Angstroms thick, far less genuine gold is needed to manufacture it, thus making the present invention very inexpensive compared to traditional genuine gold signs made with manually applied gold leaf.

Furthermore, the present invention makes use of an opaque layer underneath the genuine gold layer. The function and placement of the opaque layer will be more fully described below.

In contrast to the room temperature sign-making process of the present invention, at least one prior art process, U.S. Pat. No. 4,855,171 of McKie, employs a film laminate requiring pressure and heat to cause successful image transfer and adherence to an intended substrate.

Various other attempts have been made to provide thin film transfer materials for sign-making. For example, traditionally, "genuine gold gilding" employs the technique of hammering genuine gold in a leather mold to impress it in wafer-thin sheets upon a transfer medium, such as paper sheets. The wafer-thin gold leaf sheets are packaged into books. The present invention is a vast improvement over traditional gilding. Traditional gold-edge gilding requires enormous artistic skill and experience, as well as the use of volatile organic chemicals (VOCs) for proper application. Traditional gilding is also very time consuming and therefore expensive. In contrast, the present invention is quick, accurate, reliable, inexpensive, and does not involve a requirement for artistic skill or the use of VOCs.

Furthermore, traditional genuine gold gilding is done completely by hand, whereas the present invention is completely automated. Traditional gold leaf for gilding is usually available in pieces which are 3.5 inches square, requiring the use of hand-application of numerous individual sheets for any particular job. In contrast, the present invention is capable of being manufactured in a sign blank according to the standard web-width of 24 inches for computer-aided router engraving sign making systems. The sign blanks can be 8 feet in length. Compared to the 3.5 inch square sheet of traditional gold leaf, the automation of the present invention renders it a very significant modern advance over and above the traditional genuine gold gilding process.

Among other prior art patents concerning decorative films include U.S. Pat. No. 4,994,131, which discloses a process of preparing decorative material utilizing transfer print foils; U.S. Pat. No. 5,017,255 of Calhoun which discloses a method of transferring an inorganic image; U.S. Pat. No. 4,867,827 which discloses a process for gold foil stamping that employs gold foil in a printing process; U.S. Pat. No. 4,720,315 of Greenman discloses a method for preparing a selectively decorated resin film; and U.S. Pat. No. 4,855,171 of McKie which discloses transfer films for use in sign making. Other prior art include U.S. Pat. Nos. 4,834,276 of Logan, 4,895,287 of Wood and Patent Cooperation Treaty international application no. W015724, dated December 1990.

Some of these conventional techniques require the use of adhesives to provide an intermediate tacking surface between the intended substrate and the decorative colored dressing to be applied. Such intermediate tacking adhesives are typically comprised of volatile organic compounds (VOC) which evaporate to leave a tacky residue. Such evaporation pollutes the ambient air with VOC molecules. The present invention achieves the desired application of genuine gold to a substrate without using any VOCs at all.

The present invention relates to genuine gold dressing. The present invention uses metallic gold whose purity is at least 22/24 or 22 karat gold. Gold which is 24/24 is 100% pure gold. The term genuine gold is used in the art to refer to gold which is at least 12 karats, i.e., 12/24 or 50% gold metal.

Applying traditional genuine gold leaf in sign making produces a desirable fade-resistant graphic image, but the traditional technique of genuine gold gilding is labor intensive and slow, and requires artistic skill and experience. Traditional gold gilding first requires the manual crushing of gold nuggets into wafer thin gold leaf. The gilder then applies the wafer thin gold leaf using a soft brush. In addition, VOCs are required to tack the wafer thin gold leaf to the substrate.

In contrast, the present invention is accurate, quick, convenient, and relatively non-labor intensive due to the use of computer-aided router engraving sign making systems, and does not employ VOCs, yet produces a three dimensional graphic image of genuine gold upon a sign blank comparable to that of traditional gilding. Thus, the present invention has the advantageous image quality found in genuine gold gilding, but without the drawbacks of high cost, required use of VOCs and a requirement that the invention be practiced by artisans with a high level of artistic skill.

Of the aforementioned patents, U.S. Pat. No. 4,855,171 of McKie provides for a film which has substrate layers and which uses a computer sign-making device to cut and shape the film. McKie uses a dye or a pigment for making the sign lettering or graphics visible through a transparent or translucent structurally supportive sign sheet. However, McKie transfers only a coating to the final desired location of the sign legend, not an entire series of layers encompassing a thin layer of vapor-deposited genuine gold as in the present invention. Unlike the present invention, McKie's sign making process is limited to the making of a reverse image which is applied to a transparent substrate.

In contrast, the present invention produces three dimensional engraved sign legends in a sign blank.

In further contrast between the present invention and McKie, the dyes and pigments taught by McKie are not metallic in appearance, whereas the genuine gold of the present invention appears metallic because it is genuine metal. Such dyes and pigments of McKie are typically comprised of materials which cannot effectively withstand UV exposure. These dyes and pigments are typically used with aluminum particles to impart a partially metallic appearance. When exposure to ultra violet light causes decomposition and deterioration of the dyes and pigments, these signmaking materials typically appear silver in color, due to the aluminum particles which remain unaffected by the UV. For the foregoing reasons, McKie's process cannot produce signs with a metallic appearance which are suitable for outdoor use.

In contrast, the genuine gold blank of the present invention is naturally fade-resistant and will not tarnish or rust. Additionally, McKie teaches the adhesion of the film using a heated roller nip, whereas the present invention can be used at room temperature. McKie's adhesive is not tacky at room temperature, and requires heat to make it tacky. As a difference between McKie and the present invention, the use of McKie's heat and pressure is contraindicated for the thin metal substrates such a genuine gold, and the heat and pressure would destroy the acrylic pressure-sensitive adhesive of the present invention. In effect, the present invention eliminates the need for McKie's heated roller nip.

Calhoun, U.S. Pat. No. 5,017,255, provides for gold as a coating component, but genuine gold is not used as a durable substrate of a sign making film. In Calhoun, the gold is merely coated onto an embossed substrate and then laminated adhesively. The embossing dictates the pattern image to be transferred.

In contrast, the present invention utilizes genuine gold as a layer in a three dimensional blank which can be cut using a computer-aided sign making router and engraving system to create the three dimensional sign lettering or graphics. Unlike Calhoun, where embossing is used to create the sign lettering or graphics, the present invention avoids embossing entirely, to create the sign letterings and graphics.

Further, Calhoun applies metal coating in a flat disposition which, unlike the present invention, does not give highly desirable luster and reflectivity over a wide viewing angle.

The graphic image is cut from the sign blank of the present invention, and the three dimensional concave transverse cuts creates far greater reflectivity of the finished product, as compared to the flat-disposed coating of Calhoun.

In further contrast, the Calhoun coating is deposited upon a substrate and is not permanently bonded. The bond in Calhoun between metal coating and substrate is characterized by contact adhesion.

In the present invention, on the other hand, the genuine gold is vapor deposited and permanently bonded to its substrate.

Calhoun, unlike the present invention, requires an additional adhesive and further substrates for a base. Calhoun prepares his gold coating surfaces so as to be removable, i.e. metal is deposited to be removed. Pressure-sensitive tape is applied only onto metal areas. Further, Calhoun employs embossing, which means that metal coating is applied and then selectively removed to create the pattern.

In contrast, the present invention blankets the substrate by vapor-coating the film layer serving as the genuine gold substrate. This vapor deposition creates a permanent bond between the genuine gold and its film substrate layer. The sign lettering or graphics are then created using a computer-aided router engraving sign making system.

Since McKie uses layered substrates with dyes and pigments in a binder material, while Calhoun employs metal coatings, of which gold is an example, one skilled in the graphic arts might at first glance think of substituting the gold coating of Calhoun into the multi-layered computer-cut film of McKie. Aside from the fact that neither McKie nor Calhoun suggest or teach the invention of the other, such a combination could not work.

To begin with, there is no way to adhere the gold coating of Calhoun in the layered film of McKie because McKie's adhesive is not tacky at room temperature. Placing a coating of gold over McKie's adhesive would provided a barrier between the adhesive and the substrate to which the adhesive is intended to stick. Thus, substituting a gold layer as taught by Calhoun into the layered film of McKie would prevent proper adhesion required in McKie's invention.

Furthermore, substituting a thin layer of gold as taught by Calhoun into the invention of McKie would cause a shifting and distortion of the gold upon being subjected to McKie's required heated roller nip. The pressure of the roller nip would cause the extremely thin and pliable gold layer to shift as the McKie adhesive becomes tacky under the elevated McKie temperature. The gold sign legend of a hypothetical Calhoun-McKie combination would thus be impossible to adequately control, due to the shifting of the gold under heat and pressure.

In contrast to McKie, Calhoun, and even to the hypothetical combination of McKie and Calhoun, the present invention uses special adhesives, which do not employ VOCs within the layered sign blank to firmly and permanently attach a thin layer of genuine gold and to then computer-cut the three dimensional genuine-gold-bearing sign blank to the desired legend pattern by routing and engraving within the three dimensional sign blank. The genuine gold is at all times held within the layered sign blank.

In addition to the foregoing prior art, there is also a well-known commercial system of applying paint containing gold flecks to metallized graphic sign legends, such as made by Arlon Company of Santa Ana, Calif. and Universal Products, Inc. of Goddard, Kans. The paint contains flecks which may be genuine gold or imitation gold in the form of a gold-colored dye or pigment.

As earlier discussed, dyes and pigments cannot withstand ultraviolet light (UV) exposure and therefore cannot be suitable for making outdoor signs. Paint in which gold flecks are incorporated in a slurry will produce a sign with a durable gold legend, but such a sign will contain far more gold than a sign produced with the present invention, which also has a genuine gold outdoor-durable legend. The reason for the present invention's use of far less gold than a system employing genuine gold fleck paint is that the genuine gold layer in the present invention is very thin, preferably about 300 Angstroms.

Furthermore, the reflective brilliance of signs produced with the genuine gold fleck paint are inferior to the reflective brilliance of the genuine gold of the present invention due to the concave transverse three dimensional cuts. These concave transverse three dimensional cuts, as noted elsewhere in this disclosure, provide very superior reflective brilliance from a wide range of viewing angles.

In contrast, the signs made with paint containing flecks of gold do not provide nearly as brilliantly reflective surface, because there is far less control over the final surface characteristics of the gold when flecks of it are painted onto a substrate.

Moreover, the present invention applies a genuine gold layer within a three dimensional layered sign blank. Vapor deposition of the genuine gold is accomplished in a vacuum, as is done in the invention of Calhoun.

The concave transverse cuts into the sign blank and the vapor deposited gold layer create the reflective brilliance of the genuine gold sign legend over a wide range of viewing angles. Such widely viewable brilliance is thus a novel feature of the present invention.

In contrast, Calhoun deposits a gold layer onto an embossed substrate, wherein the gold is then selectively removed by a transfer process. Although Calhoun employs an embossing technique, the layer of sign-legend gold as Calhoun applies it does not have the benefit of an embossed substrate, and thus Calhoun's process lacks the reflective brilliance which characterizes the present invention. Calhoun, unlike the present invention, uses a release transfer material to directly contact and lift the gold layer from selected portions on the embossed surface onto which is has been deposited. This selectively removed gold is then re-deposited in a desired location.

Another important difference exemplified by the foregoing comparison of Calhoun and the present invention is that the vapor deposited genuine gold of the present invention is lodged permanently in place upon a layer which is placed within the sign blank. Although the multi-layered sign blank system having genuine gold of the present invention is cut by a computer-aided router engraving sign making system, the genuine gold is not disturbed by physical contact with a transfer material, as it is in the Calhoun process. The pattern of the sign legend is determined in the present invention by cutting the sign blank with a computer-aided routing and engraving sign making system. In contrast, in Calhoun, the pattern of the sign legend is determined by the embossing pattern of the substrate onto which the Calhoun gold is deposited.

In order to provide a genuine gold sign making sign blank which can be carved out of a three dimensional sign blank, the present invention applies a thin layer of vapor deposited gold applied over an opaque plastic film, wherein a transparent routing layer is provided above the genuine gold layer, so that the upper transparent routing layer can be routed and carved, to reveal the presence of selected portions of the vapor deposited genuine gold layer underneath. A further opaque pigmented layer is applied over the transparent routing layer to provide contrast to the revealed genuine gold lettering underneath.

The upper pigmented layer is preferably polyvinyl fluoride, and is between ½ to 3 mil thickness, preferably 1 mil, and one example is what is known in the trade as "Tedlar", such as manufactured by Dupont Chemical Co. Inc.

The next lower layer is an adhesive, which holds the upper pigmented layer to a next further lower layer, such as acrylic, namely the transparent layer to be carved, which is commonly sold as "Acrylite" and is preferably between 0.060 inch and 0.177 inch in thickness.

A further adhesive layer holds the transparent layer to a lower Tedlar layer of between 0.5 and 2 mil thickness, preferably 1 mil, and which is covered with a vapor deposited gold layer of between 100–1200 Angstroms in thickness, preferably about 300 Angstroms.

The upper Tedlar film is heat laminated onto the thin acrylic sheet to replace painted surface by hand, by running it through 2 heated rubber rollers.

The upper opaque pigmented layer, the first adhesive and the transparent acrylic layer are cut by the computer aided sign making apparatus. The transparent acrylic layer is cut to a depth of approximately 1/32 of an inch with the descending walls cut in a concave shape. The bottom wall can be textured, flat or also concave.

When complete, the sign making blank using the sign making material of the present invention reveals three dimensional lettering graphics with genuine gold, which provide superior reflectivity and viewing angles, in a single application, without the necessity to manually apply genuine gold leaf over carved sign blanks.

As compared to the prior genuine gold sign making invention, the present invention is also cheaper to manufacture. The vapor-deposited metal opaque layer is from about 100 Angstroms thick to about 1200 Angstroms thick, preferably about 300 Angstroms.

OBJECTS OF THE INVENTION

It is an object of the present invention to provide a three dimensional sign blank material deposited with genuine gold.

It is yet another object to provide a three dimensional sign blank material which can be routed with desired lettering and graphics by a conventional computerized sign making apparatus.

It is also an object of the present invention to provide an alternative for traditional manually applied gold leaf lettering and graphics upon a cut and routed wood sign blank.

It is yet another object of the present invention to provide a computerized sign carving system which avoids the need to apply traditional gold leaf by hand.

It is yet another object to provide a computerized sign carving system which has a superior viewing angle than sandblasted lettering cuts.

It is a further object of the present invention to provide a genuine gold sign making sign blank which is carved out to make three dimensional lettering within the sign blank, wherein a thin layer of vapor deposited gold is applied over an opaque plastic film, and wherein a transparent routing layer is provided above the genuine gold layer, so that the upper transparent routing layer can be routed and carved, to reveal the presence of selected portions of the vapor deposited genuine gold layer underneath.

It is yet another object to provide a computerized sign making material which reveals three dimensional lettering graphics with genuine gold, which also provides superior reflectivity and viewing angles.

It is yet an object of the present invention to use genuine gold in sign-making.

It is another object of the present invention to provide genuine gold sign blank making materials which are easily routed and engraved on computer-aided sign making systems, and are also fade resistant under exposure to UV radiation when in place as sign lettering or graphics.

It is a further object of the present invention to make genuine gold sign blank signs which are resistant to ultra violet light.

It is yet a further object of the present invention to provide signs which are fade resistant.

It is yet a further object to provide for the elimination of pollutants, such as volatile organic compounds, in the application of genuine gold lettering or graphic images.

It is a further object of the present invention to provide a genuine gold sign making routing and engraving material which is easy to cut on a computer aided sign making routing and engraving machine.

It is a further object of the present invention to provide a genuine gold sign making routing and engraving material which is cheaper to manufacture than any previous genuine gold sign making routing and engraving material.

It is yet another object to improve over the disadvantages of the prior art.

Other objects and advantages of the present invention will become apparent from the following description of the present invention.

SUMMARY OF THE INVENTION

The present invention is directed to a sign blank material deposited with genuine gold, wherein the sign blank is cut, routed and engraved with desired lettering and graphics by a conventional computerized routing and engraving sign making apparatus.

The prior art includes the use of traditional manually applied gold leaf lettering and graphics upon a cut and routed wood sign blank, such as redwood, which is insect resistant. Traditionally the preparation of the wood blank involves sanding and sealing of the wood blank, and applying of a primer coat and finishing paint. The wood blank is cut and routed out, or carved out with letters. The carved surface is prepared by sanding, sealing and application of a primer. Then a hard coat adhesive is applied and the traditional gold leaf is laid in by hand in a pain staking manual application.

The prior art includes computerized CAD router sign making systems which make masks upon sign blanks, which are then sand blasted and exposed by abrading the wood blank. These computer routing and carving systems only save on hand carving, and do not reduce the time and effort required to apply traditional gold leaf, and they require special woods which are not damaged by sandblasting.

Most importantly, the makers of signs with computerized sign carving systems still need to apply traditional gold leaf by hand.

A drawback to many of sandblasting carving systems is an aesthetic problem, in that they can only cut down vertically and across, in X-Y axes, so one cannot do beveled edges with the sandblasted devices, only perpendicular lettering cuts, which perpendicular cuts have a narrower viewing angle than bevelled edge lettering cuts.

In order to provide a genuine gold sign making sign blank which can be carved out of a three dimensional blank, present invention applies a thin layer of vapor deposited gold applied over an opaque plastic film, wherein a transparent routing layer is provided above the genuine gold layer, so that the upper transparent routing layer can be routed and carved, to reveal the presence of selected portions of the vapor deposited genuine gold layer underneath. A further opaque pigmented layer is applied over the transparent routing engraving layer to provide contrast to the revealed genuine gold lettering underneath.

When complete, the sign making blank using the sign making material of the present invention reveals three dimensional lettering graphics with genuine gold, which provide superior reflectivity and viewing angles, in a single application, without the necessity to manually apply genuine gold leaf over carved sign blanks.

In the preferred embodiment of the direct application embodiment there is an outer pigmented layer having an adhesive layer underneath for attaching the outer pigmented layer to a transparent substrate routing layer of a permanent acrylic, having a further adhesive layer underneath; a substrate layer of vapor deposited gold from about 100 Angstroms thick to about 1200 Angstroms thick, preferably about 300 Angstroms thick; and a lower layer of an opaque film, preferably about 1 mil thick.

The thickness of the vapor deposited genuine gold is ideally about 300 Angstrom units thick, but the thickness may range from 100 to 1200 Angstroms in thickness.

DESCRIPTION OF THE DRAWINGS

Although characteristic features of the present invention will be particularly pointed out in the claims, the present invention itself, and the manner in which it may be made and used, may be better understood by referring to the following description, taken in connection with the accompanying drawings, forming a part hereof, wherein like reference numerals refer to parts throughout the view, and in which:

Figure 1:
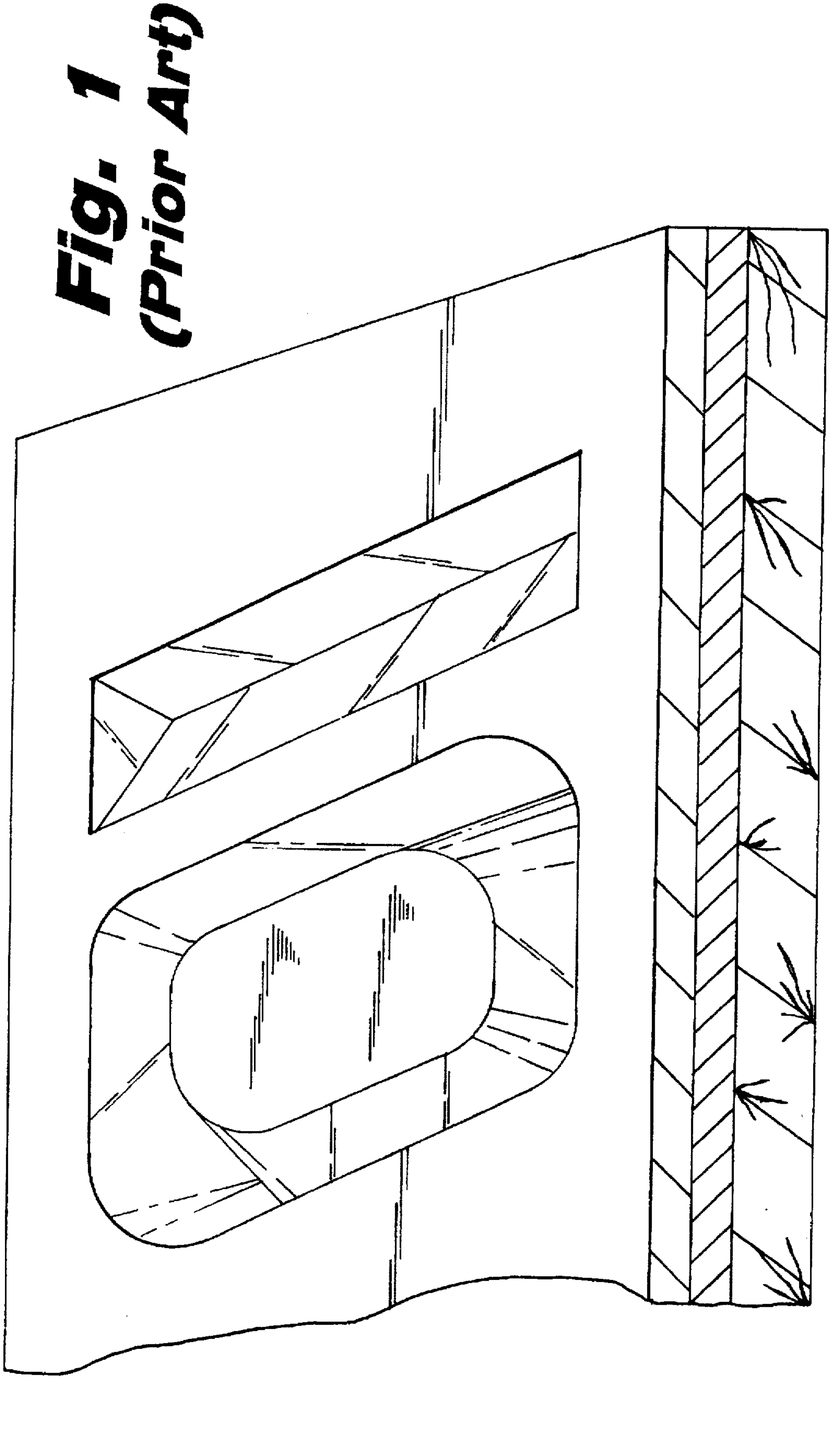
Fig. 1 (Prior Art)
FIG. 1 is a side elevational view of a section of a prior art routed and engraved sign blank, showing in layers the various substrates therein.

For purposes of clarity, the proportions in the drawings are not exactly accurate.

DETAILED DESCRIPTION OF THE PREFERRED EMBODIMENT

Referring to the drawings in detail, there is illustrated in FIG. 1 a prior art engraved sign blank wherein three dimensional letters are routed through an upper pigmented layer to a base, to which base is manually applied genuine gold leaf.

Figure 2:
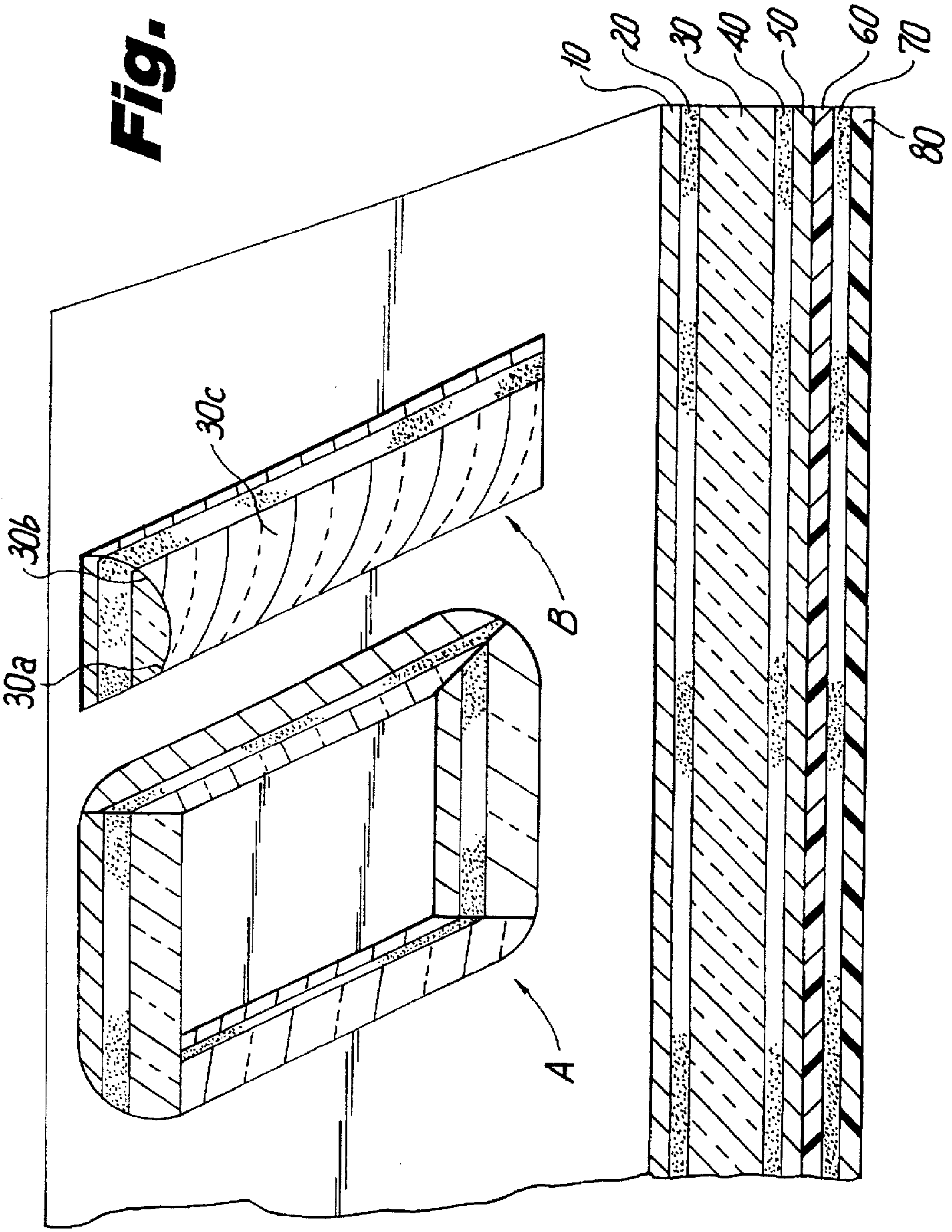
FIG. 2 is a side elevational view of a section of the three dimensional genuine gold sign blank of the present invention.

In the present invention, as shown in FIG. 2, three dimensional sign blank 1 includes an upper pigmented layer 10 of an opaque film substrate; a second adhesive layer 20 of a permanent acrylic adhesive attaching upper opaque pigmented layer 10 to a third transparent routing layer 30 of plastic material; a fourth adhesive layer 40 attaching layer 30 to a fifth substrate layer 50 of a thin coating of vapor deposited genuine gold overlaying a lower opaque plastic film base layer 60; and a lower adhesive layer 70 attached to an acrylic sheet layer 80, the aggregate of layers comprising a three dimensional layered structure comprising a sign blank capable of being cut on a computer-aided sign making router engraving system.

Continuing in FIG. 2, layer 50 is vapor deposited genuine gold of between 100–1200 Angstroms thick, preferably about 300 Angstroms thick. Lower layer 60 is opaque for the purpose of visually contrasting with and setting off the genuine gold for maximum visibility and brilliance in the finished sign. Outer pigmented layer 10 is 1 mil thick, adhesive layer 20 is 0.2 mil thick, transparent routing layer 30 is 0.060 inches thick and adhesive layer 40 is 1 mil thick. Opaque film layer 60 is 1 mil thick, lower adhesive layer 70 is ½ mil thick, and acrylic sheet 80 is 0.177 inches thick.

The present invention is directed to sign making blank material 1 deposited with genuine gold, wherein sign blank 1 has adhesive layer 70 and a acrylic sheet 80, so that the sign blank 1 is a conventional sign base, wherein the three dimensional sign blank material is cut and routed and engraved with desired lettering and graphics by a conventional computerized sign making router engraving apparatus.

In order to provide three dimensional genuine gold sign making sign blank 1, sign blank 1 includes thin layer 50 of vapor deposited gold applied over an opaque plastic film layer 60, wherein an upper transparent routing layer 30 is provided above the genuine gold layer 50, so that the upper transparent routing engraving layer 30 can be routed and carved, to reveal the presence of selected portions of the vapor deposited genuine gold layer 50 underneath. Further lower opaque layer 60 is applied under genuine gold layer 50 and upper transparent routing layer 30 to provide contrast to the revealed genuine gold lettering underneath.

Upper pigmented layer 10 is preferably polyvinyl fluoride, and is between ½ mil to 2 mil thickness, preferably 1 mil, and one example is what is known in the trade as "Tedlar®", such as manufactured by Dupont Chemical Co. Inc.

The next lower layer is adhesive layer 20, which holds the upper pigmented layer 10 to a next further transparent router layer 30, to be carved, which transparent routing layer 30 is commonly sold as "acrylic sheet" and is preferably between 0.060 inches and 0.177 inches in thickness.

Further adhesive layer 40 holds the transparent layer to a vapor deposited gold layer 50 and lower Tedlar® layer 60 of between .½ mil and 2 mil thickness, preferably 1 mil. Lower opaque Tedlar® layer 60 is attached to lower rigid base layer 80 by lower adhesive layer 70.

Upper opaque Tedlar® film layer 10 is heat laminated to transparent layer 30 by running it through 2 heated rubber rollers.

Upper opaque pigmented layer 10, first upper adhesive layer 20 and transparent plastic layer 30 are cut by a conventional computer aided sign making router engraving apparatus. Transparent routing layer 30 is cut to a depth of approximately 1/32 of an inch with the descending walls 30*a*, 30*b* cut preferably in a concave shape. Bottom wall 30*c* can be flat or also concave.

When complete, the three dimensional sign blank of the present invention reveals three dimensional lettering graphics A, B with genuine gold, which provide superior reflectivity and viewing angles, in a single application, without the necessity to manually apply genuine gold leaf over carved sign blanks.

Sign blank 1 of the present invention is put into practical application by subjecting the sign blank 1 to a computer-aided sign making routing engraving system, which sharply and cleanly cuts transversely through the film layers 10, 20, 30 of sign blank layers 10, 20 being through cut except transparent routing layer 30, is partially cut through.

In order to maximize reflectivity off the genuine gold layer 50, opaque layer 60, typically a PVF polyvinyl fluoride film substrate, is provided below genuine gold layer 50.

In summary, lower opaque layer 60 provides an opaque background for the genuine gold layer 50. Moreover, genuine gold layer 50 is viewed through a upper transparent routing layer 30.

Although an illustrative embodiment of the present invention has been described in detail herein with reference to the accompanying drawing, it is understood that the invention is not limited to the precise embodiments shown, and that various modifications may be made therein without departing from the spirit and scope of the invention.

We claim:

1. A three dimensional genuine gold sign blank substrate layer sign making material which can be cut with a computer-aided sign making router engraving system for making signs, comprising:

a plurality of substrate layers including:

an upper opaque film substrate layer;

a transparent routable substrate layer below said upper opaque film substrate layer;

a substrate layer of vapor deposited genuine gold, said substrate layer of vapor deposited genuine gold underlaying said upper opaque film substrate layer and said transparent routable substrate layer;

said substrate layer of vapor deposited genuine gold overlaying a lower opaque base substrate layer;

said plurality of substrate layers are for leaving a desired symbol selected from the group consisting of letters or graphics durably fixed in position upon a sign;

said transparent layer is for viewing the genuine gold layer in the completed sign;

said plurality of layers being bonded upon one another in a multilayered structure.

2. The genuine gold sign blank substrate layer sign making material which can be cut with a computer-aided sign making system for making signs, as in claim 1, further comprising said genuine gold layer being vapor deposited in a thickness measuring from about 100 to about 1200 Angstroms thick.

3. The genuine gold sign blank substrate layer sign making material which can be cut with a computer-aided sign making system for making signs, as in claim 1, further comprising said genuine gold layer being vapor deposited in a thickness measuring about 300 Angstroms thick.

4. The genuine gold sign blank substrate layer sign making material which can be cut with a computer-aided sign making system for making signs, as in claim 1, further comprising said opaque base layer being below said vapor deposited gold layer for visually contrasting with said genuine gold layer, said opaque layer being disposed within said plurality of layers such that, in the completed sign, said opaque layer is disposed behind said genuine gold layer with respect to a viewer's line of sight.

5. The genuine gold sign blank substrate layer sign making material which can be cut with a computer-aided sign making system as in claim 1 further comprising:

said plurality of layers being placed sequentially such that the finished sign is to be viewed by a viewer whose line of sight begins at a first opaque upper layer having at least one selective visible cut therethrough, the line of view then proceeding downwards through said upper transparent layer until the line of view intersects said genuine gold layer.

* * * * *